United States Patent
Wei

(10) Patent No.: US 9,106,367 B2
(45) Date of Patent: Aug. 11, 2015

(54) TRANSMITTER INITIATED ON-LINE RECONFIGURATION

(71) Applicant: Futurewei Technologies, Inc., Plano, TX (US)

(72) Inventor: Dong Wei, Austin, TX (US)

(73) Assignee: Futurewei Technologies, Inc., Plano, TX (US)

( * ) Notice: Subject to any disclaimer, the term of this patent is extended or adjusted under 35 U.S.C. 154(b) by 84 days.

(21) Appl. No.: 13/865,791

(22) Filed: Apr. 18, 2013

(65) Prior Publication Data

US 2013/0279687 A1     Oct. 24, 2013

Related U.S. Application Data

(60) Provisional application No. 61/635,683, filed on Apr. 19, 2012.

(51) Int. Cl.
| | | |
|---|---|---|
| *H04L 1/00* | (2006.01) | |
| *H04M 11/06* | (2006.01) | |
| *H04L 1/20* | (2006.01) | |
| *H04L 5/00* | (2006.01) | |
| *H04M 11/00* | (2006.01) | |
| *H04B 1/38* | (2006.01) | |

(52) U.S. Cl.
CPC ............ *H04L 1/0002* (2013.01); *H04L 1/0003* (2013.01); *H04L 1/20* (2013.01); *H04L 5/006* (2013.01); *H04L 5/0046* (2013.01); *H04M 11/062* (2013.01); *Y02B 60/31* (2013.01)

(58) Field of Classification Search
None
See application file for complete search history.

(56) References Cited

U.S. PATENT DOCUMENTS

| | | | |
|---|---|---|---|
| 2004/0044942 | A1 | 3/2004 | Tzannes |
| 2008/0031313 | A1* | 2/2008 | Oksman ........................ 375/222 |
| 2008/0253401 | A1* | 10/2008 | Thyagarajan et al. ........ 370/485 |
| 2009/0180526 | A1* | 7/2009 | Long ............................. 375/222 |
| 2009/0271680 | A1* | 10/2009 | Tanigawa et al. ............. 714/748 |
| 2010/0017523 | A1* | 1/2010 | Yoshiuchi ..................... 709/228 |
| 2010/0296555 | A1* | 11/2010 | Cahill et al. .................. 375/219 |
| 2012/0183026 | A1* | 7/2012 | Eriksson et al. .............. 375/222 |

FOREIGN PATENT DOCUMENTS

WO    2006081922 A1    8/2006

OTHER PUBLICATIONS

"G.fast: Combining TCAM and RCAM," ITU—Telecommunication Standardization Sector, Study Group 15, Paris, France, Feb. 27-Mar. 2, 2012, 2012-02-4A-041, pp. 1-12.

(Continued)

*Primary Examiner* — Simon Sing
*Assistant Examiner* — Jeffrey Lytle
(74) *Attorney, Agent, or Firm* — Conley Rose, P.C.; Grant Rodolph; William H. Dietrich

(57) ABSTRACT

A method implemented by a first network component (NC) in a digital subscriber line (DSL) system comprising retrieving an on-line reconfiguration (OLR) request from a control entity (CE), wherein the OLR request is generated by the CE based on a noise increase on a subscriber line between the NC and a second NC in the DSL system, and in response to the OLR request, transmitting a message to a receiver in the second NC to request for a reduced data rate on the subscriber line.

21 Claims, 4 Drawing Sheets

(56) References Cited

OTHER PUBLICATIONS

"Series G: Transmission Systems and Media, Digital Systems and Networks," "Digital Sections and Digital Line System—Access Networks," "Very High Speed Digital Subscriber Line Transceivers 2 (VDSL2)," ITU-T Telecommunication Standardization Sector of ITU, Dec. 2011, G.993.2, pp. 1-382.

"Series G: Transmission Systems and Media, Digital Systems and Networks," "Digital Sections and Digital Line System—Access Networks," "Improved impulse noise protection for DSL transceivers," ITU-T Telecommunication Standardization Sector of ITU, Jun. 2010, G.998.4, pp. 1-78.

Foreign Communication From a Counterpart Application, PCT Application PCT/US2013/037205, International Search Report dated Jul. 12, 2013, 6 pages.

Foreign Communication From a Counterpart Application, PCT Application PCT/US2013/037205, Written Opinion dated Jul. 12, 2013, 6 pages.

* cited by examiner

TRANSMITTER INITIATED ON-LINE RECONFIGURATION

CROSS-REFERENCE TO RELATED APPLICATIONS

The present application claims priority to U.S. Provisional Patent Application No. 61/635,683 filed Apr. 19, 2012 by Dong Wei and entitled "Transmitter Initiated On-Line Reconfiguration", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Digital subscriber line (DSL) technologies can provide a large bandwidth for digital communications over existing subscriber lines. Examples of DSL systems include those defined by standards including asymmetric DSL 2 (ADSL2), very-high-speed DSL (VDSL), very-high-speed DSL 2 (VDSL2), G.vector, and G.fast, which is a future standard to be issued by the International Telecommunication Union Telecommunication Standardization Sector (ITU-T) Study Group 15 (SG15). These broadband access communication technologies may provide data for triple-play services, including television, internet, voice over internet protocol (VOIP) phone.

Subscriber lines in a DSL system typically operate in a noisy environment. Exemplary sources of noise include, but are not limited to, crosstalk, impulse noise, and radio-frequency interference. Further, characteristics of noise(s) may often change over time. Although noise protection mechanisms may be set up during initialization of a subscriber line, the noise protection level can turn out to be inadequate later in showtime, which may result in errors at the end of a receiver and during re-initializations.

In use, a signal-to-noise ratio (SNR) margin may be configured to protect a subscriber line against a sudden increase of noise. Use of SNR margin may be considered a tradeoff between rate-reach performance and immunity to noise. For example, given a certain transmission power on a subscriber line, a higher SNR margin may lead to higher immunity to time-varying noise(s), but also a lower data rate.

On-line reconfiguration (OLR) functions, such as bit-swap, seamless rate adaptation (SRA), and emergency rate reduction, have been defined in current DSL standards to reconfigure data rates on a subscriber line in response to changing line conditions (e.g., an increase or decrease in noise level). Currently-defined OLR functions may all be initiated by a receiver side. Further, a receiver side-initiated OLR procedure may be triggered by SNR measurement, which may sometimes be a relatively slow process. In addition, since a transmitter side needs to respond to a OLR request sent from the receiver side, the receiver side-initiated OLR may require two-way message exchanges before operating with a new configuration. Consequently, a receiver side-initiated OLR may be relatively slow in its response to a noise condition change, which may occur quickly. This mismatch may sometimes result in communication errors from the transmitter to receiver.

SUMMARY

In one embodiment, the disclosure includes a method implemented by a first network component (NC) in a DSL system comprising retrieving an OLR request from a control entity (CE), wherein the OLR request is generated by the CE based on a noise increase on a subscriber line between the NC and a second NC in the DSL system, and in response to the OLR request, transmitting a message to a receiver in the second NC to request for a reduced data rate on the subscriber line.

In another embodiment, the disclosure includes an NC comprising a processor configured to obtain an OLR request that is retrieved from a CE, wherein the OLR request is generated by the CE based on a noise increase on a subscriber line between the NC and a second NC, and a transmitter coupled to the processor and configured to in response to the OLR request, transmit a message to a receiver in the second NC to request for a reduced data rate on the subscriber line.

In yet another embodiment, the disclosure includes a method implemented by a first NC in a DSL system comprising receiving a number of retransmission requests from a second NC in the DSL system via a subscriber line between the first NC and the second NC during a time period, determining a noise increase on the subscriber line based on the number of the retransmission requests, transmitting a request to the second NC for a reduced data rate on the subscriber line based on the noise increase, loading data bits on a subcarrier using a bit loading corresponding to the reduced data rate, wherein all of the data bits loaded on the subcarrier share a common transmit power spectral density (PSD), and transmitting the data bits to the second NC at the reduced data rate.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

To overcome potential issues raised by receiver-initiated OLR, a method referred to as transmitter controlled adaptive modulation (TCAM) uses a hierarchical modulation to deal with time-varying noise. The hierarchical modulation use multiple layers on data bits loaded on a subcarrier. For example, if 10 bits are loaded on a subcarrier, the 10 bits may be classified or structured into 5 (or another number) layers. Further, each layer of data bits may use a different transmit power spectral density (PSD). Accordingly, TCAM may require a special type of physical layer retransmission request to match the multi-layer hierarchy of bit-loading.

Based on the number of retransmission requests during a time-division duplexing (TDD) frame, the number of active layers of modulation can be modified for the next TDD frame. Besides the high complexity of hierarchical modulation, TCAM may not work well with trellis coding. Consequently, the net coding gain brought by trellis coding may not be obtainable, which may lead to degradation of rate-reach performance.

Disclosed herein are apparatuses, systems, and methods for transmitter-initiated OLR (TIOLR). According to embodiments taught herein, when noise condition on a subscriber line between a transmitting side and a receiving side changes, an OLR procedure may be initiated by the transmitting side without relying on any signal-to-noise ratio (SNR) measurement from the receiving side. Specifically, one way of triggering the TIOLR is through the monitoring of retransmission requests received by the transmitting side over a given time period, since a jump in retransmission requests may indicate a noise increase. Another way of triggering the TIOLR is through an OLR request sent from a control entity (CE) and retrieved by the transmitting side, since the CE may possess instantaneous knowledge of noise conditions on subscriber lines. In some embodiments, the disclosed TIOLR may require only one-way message sent from the transmitting side to the receiving side. Thus, reconfiguration may occur relatively quicker compared than conventional receiver-initiated OLR, thereby reducing or avoiding communication errors.

Figure 1:
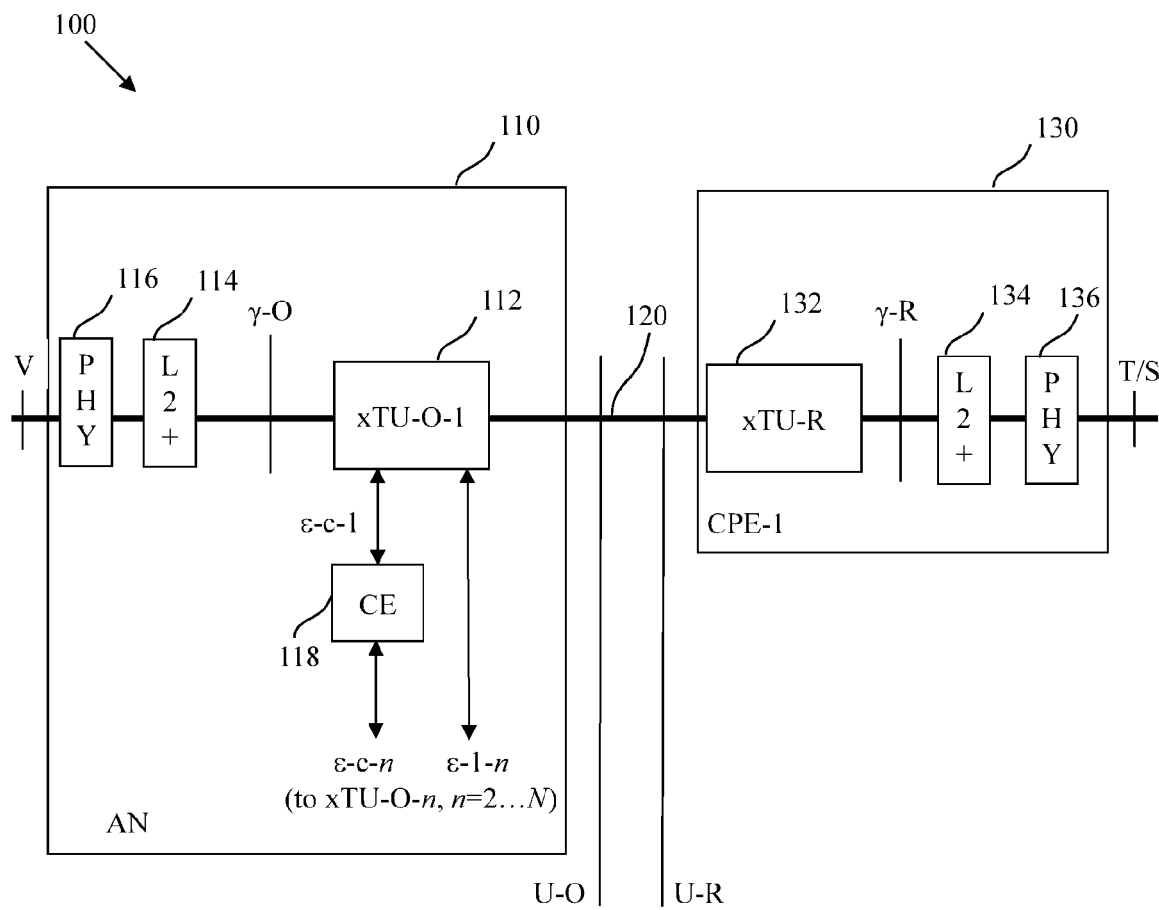
FIG. 1 illustrates an embodiment of a reference model of a DSL system.

FIG. 1 illustrates an embodiment of a reference model of a DSL system 100, in which embodiments of transmitter-initiated OLR may operate. As shown in FIG. 1, the DSL system 100 comprises an access node (AN) 110 and a customer premises equipment (CPE) 130 coupled to the AN 110 via a subscriber line 120. It should be understood that a DSL system in practice may comprise a plurality of CPEs and one or more ANs, but only a portion of the DSL system is used herein in the interest of clarity. One of ordinary skill in the art will recognize how to implement principles disclosed herein to a more complex DSL system.

Depending on the supported standard, the DSL system 100 may be referred to as an xDSL system, where 'x' may indicate a DSL standard. For instance, 'x' stands for 'A' in ADSL2 or ADSL2+ systems, and 'x' stands for 'V' in VDSL or VDSL2 systems. When a transceiver in the DSL system 100 is located in a central office (CO) or operator distribution point, the transceiver may be referred to as an xTU-O (or sometimes as xTU-C). In practice, as long as the transceiver is located at an operator end of the DSL system or loop (including a CO, exchange, or cabinet), it may be referred to as an xTU-O. On the other hand, when a transceiver in the DSL system 100 is located at a remote or user end such as a customer premise, the transceiver may be referred to as an xTU-R. For example, if the DSL system 100 is a VDSL2 system, a CO transceiver may then be referred to as a VDSL2 transceiver unit (VTU) at an optical network unit (VTU-O), and a CPE transceiver may be referred to as a VTU at a remote terminal (VTU-R).

The AN 110 may reside in a CO, exchange, cabinet, or distribution or drop point. The AN 110 may comprise a digital subscriber line access multiplexer (DSLAM) or be implemented as part of a DSLAM. As shown in FIG. 1, the AN 110 may comprise one or more xTU-Os, which may be denoted as xTU-O-n, where n is an integer between 1 and N, and where N denotes a number of xTU-Os present in the AN 110. For illustrative purposes, one xTU-O-1 112 is described in detail as an example. The xTU-O-1 112 may comprise a downstream transmitter and an upstream receiver for communication with the CPE 130. The AN 110 may further comprise a cross-connect, and a physical interface to a broadband network. Specifically, the xTU-O-1 112 may be coupled or connected to Layer 2 and above (denoted as L2+ 114 and include data link layer and other layers) via a γ-O reference point. The L2+ 114 may in turn be connected to a physical layer (PHY) 116, which communicates with a broadband network (not shown in FIG. 1) via a V interface.

The AN 110 may further comprise a CE 118 coupled to all xTU-O(s) via ϵ-c reference points. For example, the CE 118 may be connected to the xTU-O-1 112 via an ϵ-c-1 reference point. In use, the CE 118 may possess predictive or instantaneous knowledge of noise change, such as a noise increase due to the activation of a new subscriber line or the activation of a symbol position in a TDD frame, or noise decrease due to the deactivation of an existing subscriber line or the deactivation of a symbol position in a TDD frame. For example, some line condition changes (e.g., adding a new line) may be within a controlled environment overseen by the CE 118, thus the CE 118 may predict in advance which line or lines may need an OLR. In addition, the CE 118 may detect any sudden noise increase based on real-time information, such as error samples fedback from the CPE 130, retrieved by the CE 118. In all of above examples, the CE 118 may learn the noise change faster than a xTU-R 132 in the CPE 130, which relies on SNR measurements to detect noise change. In an embodiment, the CE 118 may generate an OLR request based on a noise increase detected by the CE 118 and forward the OLR request to the xTU-O-1 112. In turn, the xTU-O-1 112 may obtain or retrieve the OLR request from the CE 118 to initiate an OLR procedure. Note that the xTU-O-1 112 may also be directly coupled to other xTU-O(s) present in the AN 110 besides going through the CE 118 and via an ϵ-1-n interface.

Each of the xTU-O-1 112 and the CE 118 may be considered a network component (NC) or node that is capable of communicating with other NCs. Alternatively, the xTU-O-1 112 and the CE 118 may be considered different parts or modules of a single NC (e.g., if the AN is considered a single NC). Although the xTU-O-1 112 and the CE 118 are shown in FIG. 1 as in one location, in practice, the xTU-O-1 112 and the CE 118 may be at different locations. For example, the xTU-O-1 112 may reside in a DSLAM away from a CO, while the CE 118 may reside in the CO.

The AN 110 may communicate with the CPE 130 through a U-O interface at the operator side and through a U-R interface at the user side. The CPE 130 may sometimes be referred to interchangeably as an end terminal (NT). Note the AN 110 may communicate with a plurality of CPEs, thus the CPE 130 is also labeled in FIG. 1 as CPE-1. The CPE 130 may comprise a xTU-R 132, which may comprise an upstream transmitter and a downstream receiver for communication with the xTU-O-1 112. The xTU-R 132 may be coupled or connected to Layer 2 and above (denoted as L2+ 134 and include data link layer and other layers) via a γ-R reference point. The L2+ 134 in turn may be connected to a PHY 136, which may communicate with other network components or devices (not shown in FIG. 1) via a T/S interface. For example, the CPE 130 may be located at a customer premise and coupled to a telephone, a computer, a television, other devices, or combinations thereof. The CPE 130 may comprise a switch and/or a splitter, which may couple the subscriber line 120 (and potentially other subscriber lines) to a telephone, a computer, or a television. The PHY 116 and/or the PHY 136 may be further classified into several sublayers, e.g., including a transport protocol specific-transmission convergence (TPS-TC) sublayer, a physical media specific-transmission convergence (PMS-TC) sublayer, and a physical media dependent (PMD) sublayer.

The subscriber line 120 may take any form or be made of any suitable material such as copper wire or optical fiber. The DSL system 100 may comprise multiple subscriber lines 120, and some of the subscriber lines may be bundled in a binder. Further, the subscriber line 120 may be a robust management channel or the DSL system 100 may comprise an additional robust management channel. The robust management channel may carry important information such as configuration parameters, bit-loading settings, etc.

A transmitter or a receiver described herein may reside in any suitable location, e.g., in the AN 110, in the CPE 130, or in a DSLAM which may be between the AN 110 and the CPE 130. For example, if a disclosed OLR procedure concerns the upstream direction, a transmitter may reside in the CPE 130, and its corresponding receiver may reside in the AN 110. Otherwise, if a disclosed OLR procedure concerns the downstream direction, a transmitter may reside in the AN 110, and its corresponding receiver may reside in the CPE 130.

As mentioned previously, during transmission of user data from a transmitting side to a corresponding receiving side over a subscriber line (e.g., the subscriber line 120), the level of noise or noises on the subscriber line may change at any time, which may or may not be predictable. In an embodiment, when a noise suddenly increases on the subscriber line, the transmitting side may rapidly observe or discover such a change and immediately perform a TIOLR to switch to a reduced bit-loading, which may help reduce or avoid communication error. There may be various approaches or ways to trigger a TIOLR procedure.

In a first approach, a TIOLR procedure may be triggered autonomously by the transmitting side. For instance, a sudden increase of noise may lead to more user data being lost during transmission or rendered erroneous when received by the receiving side. Accordingly, the receiving side may send back to the transmitter more retransmission requests, which leads to a jump in a number of retransmission requests received by the transmitting side. It should be understood that each of the transmitting side and the receiving side may comprise a transmitter, a receiver, and a processor, thus both the transmitting side and the receiving side may be capable of transmitting, receiving, and processing data.

In the first approach, the transmitting side may observe the number of retransmission requests sent from the receiving side during a given period of time (e.g., the duration of at least one TDD frame) to determine whether there is a sudden increase of noise. The first approach assumes the presence of a generic PHY retransmission function in the pair of the transmitting and receiving sides. Note that any type of PHY retransmission request can be used herein, which is different from TCAM, as TCAM requires a special type of retransmission request to conform to its multi-layer hierarchy. Moreover, without the need for any layer hierarchy, the transmitting side may load data bits on a subcarrier (as an example in a group of subcarriers) using a bit loading corresponding to a reduced data rate, and all of the data bits loaded on the subcarrier may share a common transmit PSD.

In a second approach, a TIOLR procedure may be triggered by an OLR request from a CE (e.g., the CE 118). Recall that the CE may possess prior, instantaneous, or relatively quicker knowledge of any noise change on the subscriber line and may detect any sudden noise increase based on real-time information, such as error sample feedbacks from the receiving side. After discovering a noise increase, the CE may generate an OLR request, which may be retrieved or fetched by the transmitting side. In response, the transmitting side may initiate an OLR procedure by transmitting a message to the receiving side to request for a reduced data rate on the subscriber line. In the second approach, data bits loaded onto a subcarrier may either have one layer (i.e., all bits treated the same) or a multi-layer hierarchy, such as those used in TCAM.

Compared with receiver-initiated OLR procedures, TIOLR triggered either by the first approach or second approach may not rely on SNR measurements sent from the receiving side. As a result, OLR can be initiated relatively quicker after a noise level change, which may help reduce or eliminate communication error.

After OLR is initiated by the transmitting side, a data rate from the transmitting side to the receiving side will be reduced. The reduced data rate and a time regarding when to switch to a new configuration may be specified during the OLR procedure. In an embodiment, a configuration parameter denoted as $\Delta b$ may be defined to determine the reduction in bit-loading per sub-carrier. The parameter $\Delta b$ may either be the same for all used sub-carriers in the entire spectrum, or may be the same for all used sub-carriers within a predefined sub-carrier group. For example, in a sub-carrier group denoted as k, if $\Delta b(k)<=0$, it indicates that a TIOLR function used to perform TIOLR is disabled for the sub-carrier group k; otherwise, it indicates that the TIOLR function is enabled. For all the used sub-carriers in the sub-carrier group k, the same bi (denoting a number of bits loaded to a sub-carrier) reduction $\Delta b(k)$ may be applied. Specifically, a new bi'=bi−$\Delta b(k)$.

In some embodiments, if the new bi' value ends up being less than 2, it may be set to 0. In this case, no 1-bit loading is created in TIOLR. Further, if a resulted bi' contains an odd number of 1-bit constellation points and trellis coding is enabled, the last 1-bit constellation, which may be determined according to a reordered tone ordering table, may be set to bi'=0.

The parameter $\Delta b$ may be stored and communicated using various approaches. In a first example, $\Delta b$ may be pre-determined and pre-stored by both a transmitting side and a receiving side, e.g., during system initialization, to indicate how many bits per subcarrier to reduce in the event of a noise increase. Thus, when a noise changes during showtime, both the transmitting and receiving sides already have $\Delta b$, allowing them to react immediately to the noise change.

In a second example, the parameter $\Delta b$ may be communicated between the transmitting and receiving sides over a robust management channel described previously. $\Delta b$ can be robustly communicated at the start of each interval in which $\Delta b$ can be modified (e.g., in a sync symbol, which may be located at the start or the end of each super-frame). When the receiving side receives a TIOLR message, it may calculate all affected PMD sub-layer parameters and PMS-TC sub-layer parameters, and switch to the new configuration. In addition, after finishing a TIOLR procedure, the receiving side may further perform other OLR procedures, such as initiating a standard SRA procedure to update one or more fine gains denoted as gi.

In some embodiment, the TIOLR may require only one-way message exchange before switching to a new configuration. For example, a transmitter may send a request to a receiver for a reduced data rate from the transmitter to the receiver, and the request may specify a time of switching. Thus, the receiver does not need to respond or feedback to the transmitter before reconfiguration happens. Compared with current OLRs which require two-way message exchange, the one-way message exchange may lead to faster reaction to noise condition change and hence reduce or avoid errors and retrains. Note that in some cases the TIOLR may still need two-way message exchanges, e.g., when a transmitter is located in a CPE, a receiver is located in a CO, and the TIOLR is triggered by a CE in the CO.

Although most of the TIOLR descriptions herein take the assumption of a noise increase, it should be understood that when the noise decreases, similar TIOLR schemes may be implemented to increase a data rate of the subscriber line, e.g., by increasing bit loading per sub-carrier. In addition, after a TIOLR procedure is performed to stabilize the subscriber line, if the noise condition improves later, a standard SRA procedure may also be performed to increase the data rate. It should be understood that TIOLR schemes disclosed herein may be independent of the choice of forward error-correcting (FEC) coding, which may employ a concatenated Reed-Solomon code, trellis code, or low-density parity-check (LDPC) code. Therefore, any net coding gain that may be obtained by FEC may be maintained.

With TIOLR, it is feasible to operate with a reduced SNR margin or even a zero SNR margin without increasing an error rate. The reduced or zero SNR margin may yield a higher achievable data rate with the same transmit PSD. For instance, a 6 decibel (dB) SNR margin may correspond roughly to a sacrifice of 2 bits per second per Hertz (/s/Hz) in spectral efficiency. With a 100 Mega Hz (MHz) bandwidth, for example, the sacrifice may correspond to up to 200 Megabits per second (Mb/s) in aggregate data rate. Such reduction in SNR margin is feasible due to the timely response TIOLR has to changing noise levels.

Figure 2:
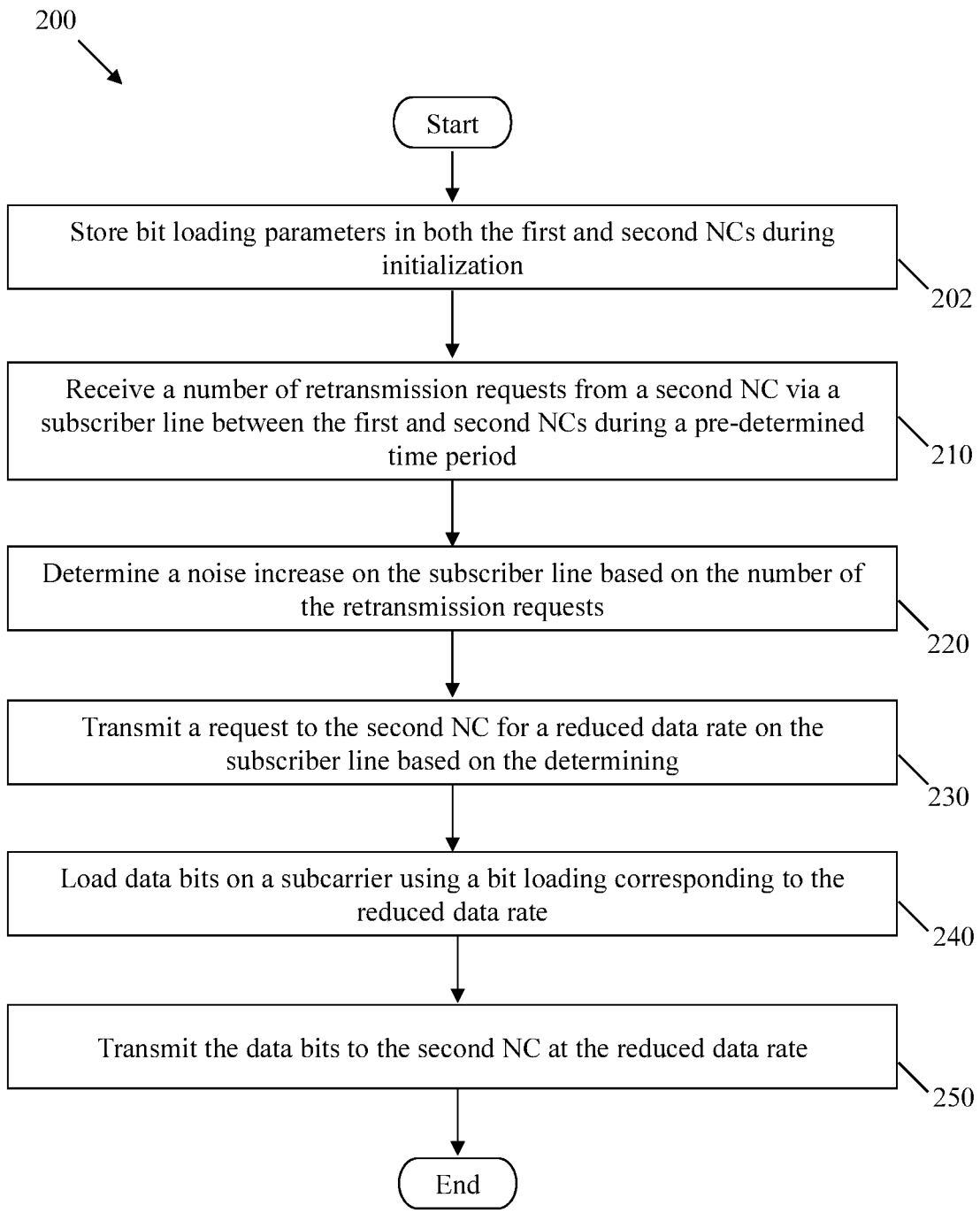
FIG. 2 illustrates an embodiment of a transmitter-initiated OLR (TIOLR) method.

FIG. 2 illustrates an embodiment of a TIOLR method 200 triggered autonomously by a transmitting side. Assume a first NC and a second NC, the first NC is the transmitting side and the second NC is the receiving side. For example, using the context of the DSL system 100, in the downstream direction, the first NC may be the xTU-O-1 112, while the second NC may be the xTU-R 132. In the upstream direction, the first NC may be the xTU-R 132, while the second NC may be the xTU-O-1 112. The method 200 may start in step 202, in which the method 200 may store one or more bit loading parameters in both the first and second NCs during initialization of a communication channel between the first and second NCs.

In step 210, the first NC may receive a number of retransmission requests from the second NC via a subscriber line between the first and second NCs during a pre-determined time period. The pre-determined time period may be, for example, the duration of a TDD frame or a plurality of TDD frames. In step 220, the method 200 may determine a noise increase on the subscriber line based on the number of the retransmission requests. In an embodiment, the determining comprises comparing the number of the retransmission requests with a pre-determined threshold, which may be any suitable number (e.g., a number which indicates that the increased noise is not an impulse noise) dependent on implementation. In step 230, the method 200 may transmit a request to the second NC for a reduced data rate on the subscriber line based on the noise increase. In step 240, the method 200 may load data bits on a subcarrier using a bit loading corresponding to the reduced data rate. In step 250, the method 200 may transmit the data bits to the second NC at the reduced data rate. Note that the request transmitted in step 230 may not require a response from the second NC before transmitting the data bits to the second NC.

Note that the method 200 may be modified within the scope of the present disclosure. For example, in step 202, the first NC may transmit the one or more bit loading parameters through a robust management channel to the second NC prior to the transmission of data. For another example, the method 200 may further comprise a step to reduce a SNR margin of the data bits before or when transmitting the data bits to the second NC.

Figure 3:
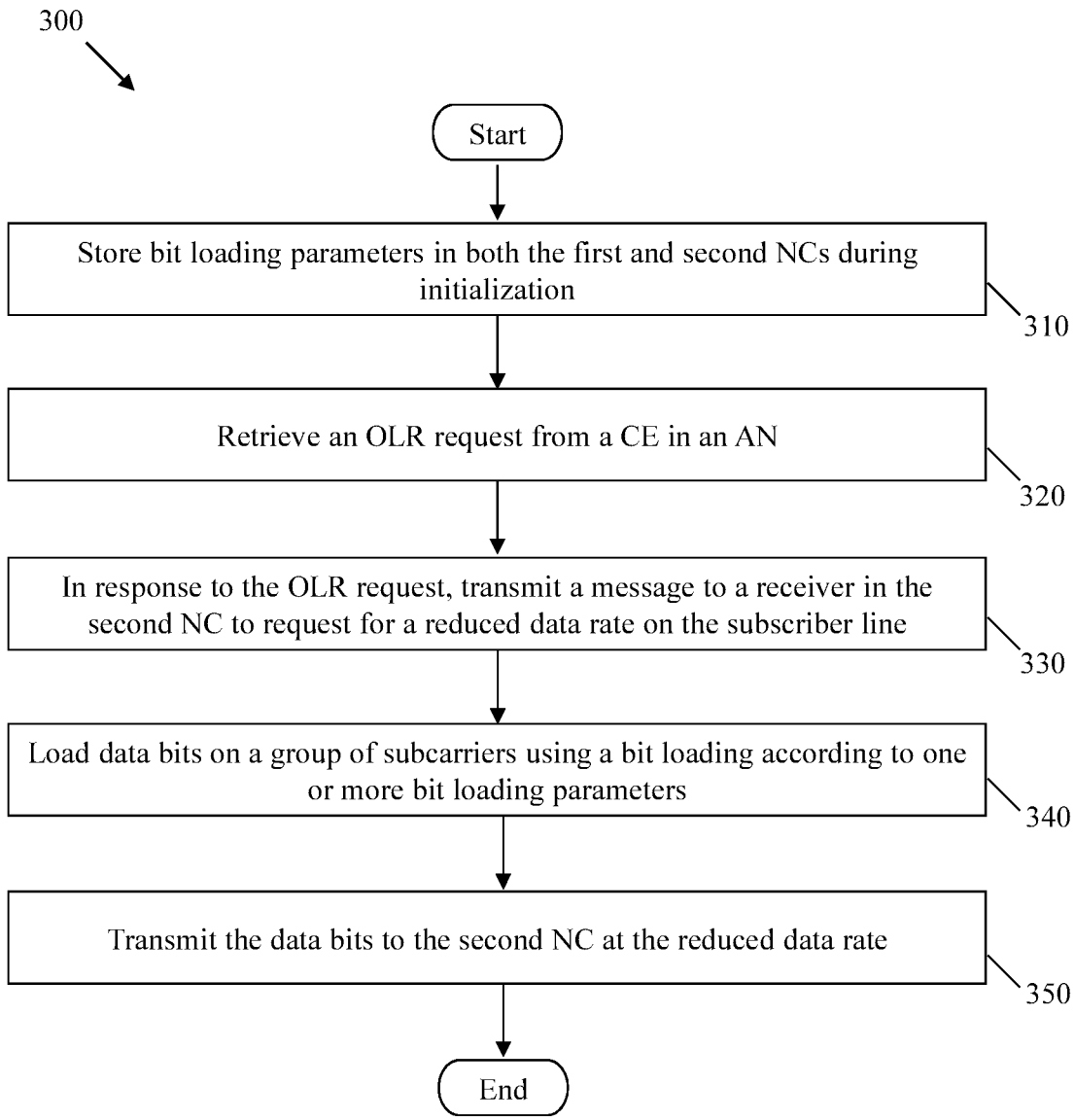
FIG. 3 illustrates an embodiment of another TIOLR method.

FIG. 3 illustrates an embodiment of a TIOLR method 300 triggered by an OLR request from a CE. Similar to the method 200, the method 300 also assumes the first and second NCs. The method 300 may start in step 310, in which the method 300 may store one or more bit loading parameters in both the first and second NCs during initialization of a communication channel between the first and second NCs. In step 320, the method 300 may retrieve an OLR request from a CE in an AN, wherein the OLR request is generated by the CE based on a noise increase on a subscriber line between the NC and a second NC in the DSL system. The noise increase may be predicted or observed by the CE without relying on any signal-to-noise (SNR) measurement performed by the second NC. The OLR request retrieved from the CE may be in any form as long as it comprises necessary instructions for the transmitting side to start an OLR. Further, retrieving may be locally (e.g., both the CE and the first NC located in the AN) or remotely (e.g., the CE and the first NC located in different places).

In step 330, the method 300 may, in response to the OLR request, transmit a message to a receiver in the second NC to request for a reduced data rate on the subscriber line. In step 340, the method 300 may load data bits on a group of subcarriers using a bit loading according to one or more bit loading parameters. In step 350, the method 300 may transmit the data bits to the second NC at the reduced data rate. Note that the message transmitted in step 330 may not require a response from the second NC before transmitting the data bits to the second NC.

Note that the method 300 may be modified within the scope of the present disclosure. For example, in step 310, the first NC may transmit the one or more bit loading parameters through a robust management channel to the second NC prior to the transmission of data. For another example, the method 300 may further comprise a step to reduce a SNR margin of the data bits before or when transmitting the data bits to the second NC.

Figure 4:
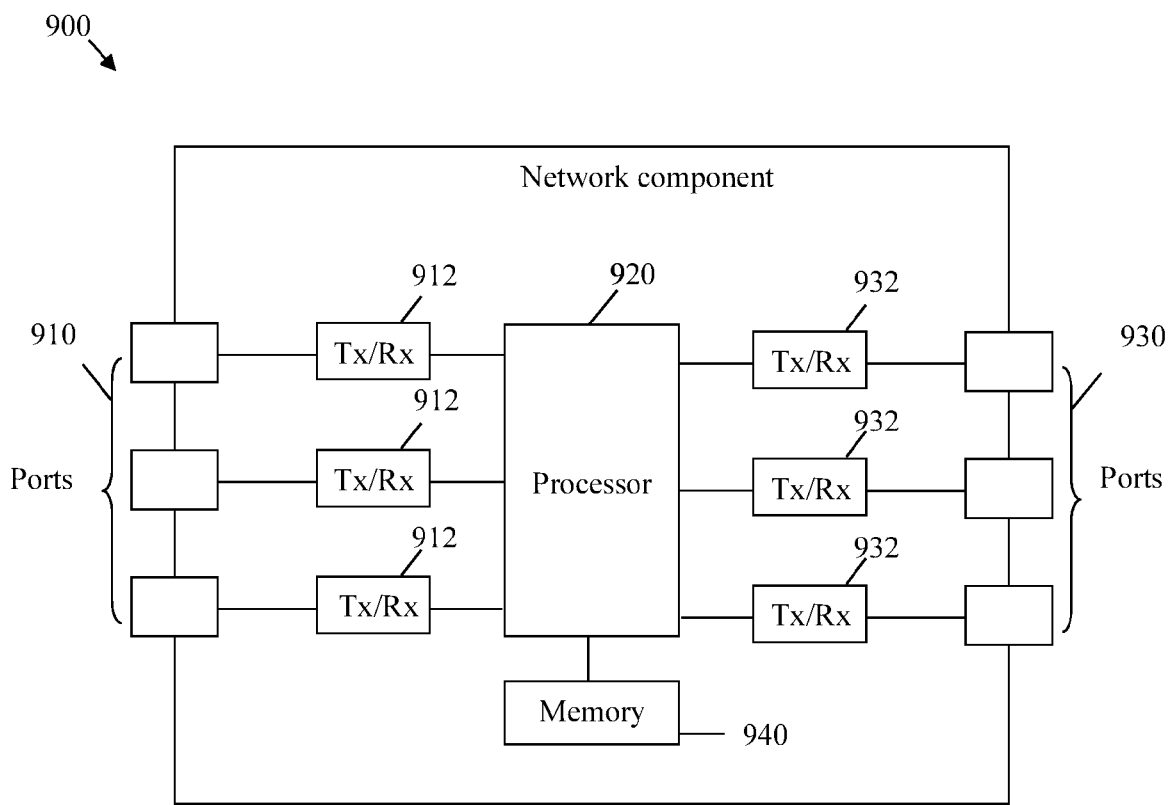
FIG. 4 illustrates an embodiment of a network component.

FIG. 4 illustrates an embodiment of a computer device or NC 900, which may comprise, for example, a transceiver (xTU-O or xTU-R) as described above, within a network or system. The NC 900 may be a DSL modem located on an operator's end such as a CO, in which case each of a first plurality of ports 910 may be connected or coupled to a subscriber line. Alternatively, the NC 900 may be located on a user's end such as a CPE, in which case there may be only one port 910 coupled to one subscriber line. A transmitter (Tx)/receiver (Rx) unit 912 may be coupled to each port 910 and configured to transmit data to or receive data from other DSL modems or network units. A Tx/Rx 912 may, for example, comprise an analog-to-digital converter (ADC), filter(s), amplifier(s), and/or a digital-to-analog converter (DAC).

A logic unit or processor 920 coupled to the plurality of Tx/Rx units 912 may be configured to process data and determine which DSL modem or network unit to send the data to. The processor 920 may be implemented as one or more central processing unit (CPU) chips, cores (e.g., a multi-core processor), field-programmable gate arrays (FPGAs), application specific integrated circuits (ASICs), and/or digital signal processors (DSPs). A memory 940 may be coupled to the processor 920 and configured to store various types of data.

Since the NC 900 may be an intermediary between two network units or sources, it may process and forward data from one source to another. Thus, the NC 900 may further comprise a second plurality of ports 930 coupled to a second plurality of Tx/Rx units 932 for transmitting data to or receiving data from other network units. The processor 920 may be configured to implement any of the schemes/methods described herein, such as the TIOLR method 200 and the TIOLR method 300.

The memory 940 may be any suitable type of memory or combination of memories. For example, the memory 940 may comprise a secondary storage, a random access memory (RAM), and a read only memory (ROM). A secondary storage is typically comprised of one or more disk drives or tape drives and is used for non-volatile storage of data and as an over-flow data storage device if a RAM is not large enough to hold all working data. The secondary storage may be used to store programs that are loaded into the RAM when such programs are selected for execution. A ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and the RAM is typically faster than to the secondary storage.

It is understood that by programming and/or loading executable instructions onto NC 900, at least one of the processor 920 and the memory 940 are changed, transforming the NC 900 in part into a particular machine or apparatus (e.g., an AN or a CPE having the functionality taught by the present disclosure). The executable instructions may be stored on the memory 940 and loaded into the processor 920 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner, as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one of ordinary skill in the art and may be made without departing from the spirit and scope disclosed herein.

What is claimed is:

1. A method implemented by a first network component (NC) in a access node (AN) in a digital subscriber line (DSL) system comprising:
retrieving an on-line reconfiguration (OLR) request from a control entity (CE), wherein the OLR request is generated by the CE based on a noise increase on a subscriber line between the NC and a second NC at a customer premise in the DSL system; and
in response to the OLR request, transmitting a message to a receiver in the second NC to request for a reduced data rate on the subscriber line,
wherein the noise increase is predicted or observed b the CE without relying on any signal-to-noise (SNR) measurement performed by the second NC.

2. The method of claim 1, wherein after transmitting the message to the receiver, the method further comprises:
loading the data bits on a group of subcarriers using a bit loading according to one or more bit loading parameters; and
transmitting the data bits to the second NC at the reduced data rate.

3. The method of claim 2, wherein the message does not require a response from the second NC before transmitting the data bits to the second NC.

4. The method of claim 3, wherein the second NC is configured to:
receive the message;
calculate a number of physical medium dependent (PMD) sub-layer parameters and physical media specific-transmission convergence (PMS-TC) sub-layer parameters in response to the message;
switch to a new configuration according to the PMD and PMS-TC parameters; and
receive the data bits at the reduced data rate using the new configuration.

5. The method of claim 3, wherein the first NC and the CE are both located in a central office (CO) in the DSL system, and wherein the second NC is located in a CPE in the DSL system.

6. The method of claim 2, further comprising reducing a signal-to-noise (SNR) margin of the data bits before or when transmitting the data bits to the second NC.

7. The method of claim 2, further comprising storing the one or more bit loading parameters in both the first and second NCs during initialization of a communication channel between the first and second NCs.

8. The method of claim 2, further comprising transmitting the one or more bit loading parameters through a robust management channel to the second NC prior to the transmission of the data bits.

9. A first network component (NC) in a access node (AN) comprising:
a memory;
a processor coupled to the memory, the processor configured to:
obtain an on-line reconfiguration (OLR) request that is retrieved from a control entity (CE), wherein the OLR request is generated by the CE based on a noise increase on a subscriber line between the first NC and a second NC at a customer premise; and
a transmitter coupled to the processor and configured to:
in response to the OLR request, transmit a message to a receiver in the second NC to request for a reduced data rate on the subscriber line,
wherein the noise increase is predicted or observed by the CE without relying on any signal-to-noise (SNR) measurement performed by the second NC.

10. The first NC of claim 9, wherein after transmitting the message to the receiver, the processor is further configured to load the data bits on a group of subcarriers using a bit loading according to one or more bit loading parameters, and wherein the transmitter is further configured to transmit the data bits to the second NC at the reduced data rate.

11. The first NC of claim 10, wherein the message does not require a response from the second NC before transmitting the data bits to the second NC.

12. The first NC of claim 10, the processor is further configured to reduce a signal-to-noise (SNR) margin of the data bits before or when transmitting the data bits to the second NC.

13. The first NC of claim 10, wherein the processor is further configured to store the one or more bit loading parameters in the memory NCs during initialization of a communication channel between the first and second NCs, wherein the one or more bit loading parameters are also stored in a memory in the second NC before the OLR request is retrieved by the first NC.

14. The first NC of claim 10, the transmitter is further configured to transmit the one or more bit loading parameters through a robust management channel to the second NC prior to the transmission of the data bits.

15. A method implemented by a first network component (NC) in a access node in a digital subscriber line (DSL) system comprising:
receiving a number of retransmission requests from a second NC at a customer premise in the DSL system via a subscriber line between the first NC and the second NC during a time period;
determining a noise increase on the subscriber line based on the number of the retransmission requests, wherein the determining does not rely on any signal-to-noise (SNR) measurement performed by the second NC;
transmitting a request to the second NC for a reduced data rate on the subscriber line based on the noise increase;
loading the data bits on a subcarrier using a bit loading corresponding to the reduced data rate, wherein all of the data bits loaded on the subcarrier share a common transmit power spectral density (PSD); and
transmitting the data bits to the second NC at the reduced data rate.

16. The method of claim 15, wherein the time period is no less than the duration of a time-division duplexing (TDD) frame, wherein the determining comprises comparing the number of the retransmission requests with a pre-determined threshold.

17. The method of claim 16, wherein one or more bit loading parameters are pre-determined and stored in both a memory of the first NC and a memory of the second NC before the OLR request is retrieved by the first NC.

18. The method of claim 16, further comprising transmitting the one or more bit loading parameters through a robust management channel to the second NC prior to the transmission of the data bits.

19. The method of claim 15, wherein the request does not require a response from the second NC before transmitting the data bits to the second NC.

20. The method of claim 15, further comprising reducing a signal-to-noise (SNR) margin of the data bits before or when transmitting the data bits to the second NC.

21. A method for on-line reconfiguration (OLR) implemented through a transceiver unit at an operator side (xTU-O) in a digital subscriber line (DSL) system, comprising:
- receiving, from a control entity (CE), an instruction over a management interface, wherein the instruction is based on a noise increase determined by the CE;
- transmitting, to a transceiver unit at a remote terminal (xTU-R), an OLR request in accordance with the instruction without having received any signal-to-noise ratio measurement from the xTU-R; and
- awaiting a response from the xTU-R after transmission of the OLR request.

* * * * *

UNITED STATES PATENT AND TRADEMARK OFFICE
CERTIFICATE OF CORRECTION

| | | |
|---|---|---|
| PATENT NO. | : 9,106,367 B2 | Page 1 of 1 |
| APPLICATION NO. | : 13/865791 | |
| DATED | : August 11, 2015 | |
| INVENTOR(S) | : Don Wei | |

It is certified that error appears in the above-identified patent and that said Letters Patent is hereby corrected as shown below:

In the Claims:

Column 11, Lines 2-16, Claim 1 should read as:

1. A method implemented by a first network component (NC) in a digital subscriber line (DSL) system comprising:
    retrieving an on-line reconfiguration (OLR) request from a control entity (CE), wherein the OLR request is generated by the CE based on a noise increase on a subscriber line between the NC and a second NC in the DSL system; and
    in response to the OLR request, transmitting a message to a receiver in the second NC to request for a reduced data rate on the subscriber line,
    wherein the noise increase is predicted or observed by the CE without relying on any signal-to-noise (SNR) measurement performed by the second NC.

Signed and Sealed this
Twenty-ninth Day of March, 2016

Michelle K. Lee
*Director of the United States Patent and Trademark Office*